(12) United States Patent
Haven et al.

(10) Patent No.: US 11,047,650 B2
(45) Date of Patent: Jun. 29, 2021

(54) TRANSPARENT COMPOSITE HAVING A LAMINATED STRUCTURE

(71) Applicant: SAINT-GOBAIN CERAMICS & PLASTICS, INC., Worcester, MA (US)

(72) Inventors: Drew T. Haven, Milford, NH (US); Charles Wooddell, Colleyville, TX (US); David J. Weeden, Concord, NH (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 193 days.

(21) Appl. No.: 16/127,373

(22) Filed: Sep. 11, 2018

(65) Prior Publication Data

US 2019/0101364 A1    Apr. 4, 2019

Related U.S. Application Data

(60) Provisional application No. 62/565,763, filed on Sep. 29, 2017.

(51) Int. Cl.
*F41H 5/04* (2006.01)
*B32B 17/06* (2006.01)
*B32B 18/00* (2006.01)

(52) U.S. Cl.
CPC ......... *F41H 5/0407* (2013.01); *B32B 17/064* (2013.01); *B32B 18/00* (2013.01); *B32B 2250/05* (2013.01); *B32B 2571/02* (2013.01)

(58) Field of Classification Search
CPC ... B32B 17/064; B32B 18/00; B32B 2571/02; B32B 2250/05; F41H 5/0407
See application file for complete search history.

(56) References Cited

U.S. PATENT DOCUMENTS

| 3,380,406 A | 4/1968 | Gosnell |
| 3,471,266 A | 10/1969 | La Belle, Jr. |
| 3,591,348 A | 7/1971 | La Belle, Jr. |
| 3,608,050 A | 9/1971 | Carman et al. |

(Continued)

FOREIGN PATENT DOCUMENTS

| CN | 87108007 A | 6/1988 |
| CN | 1058055 A | 1/1992 |

(Continued)

OTHER PUBLICATIONS

United States Statutory Invention Registration #H1519, published Mar. 5, 1996.

(Continued)

*Primary Examiner* — Ramsey Zacharia
(74) *Attorney, Agent, or Firm* — Abel Schillinger, LLP; Robert N. Young

(57) ABSTRACT

Novel transparent composites have been developed that have relatively lower areal densities of conventional transparent composites, where the composites are tested for the same threat levels as specified in the NIT or STANAG standards. Particular transparent composites can withstand projectiles having relatively high kinetic energy, for example, using STANAG 4 testing conditions. Further, the novel transparent composites can withstand multiple hits using Multiple Hit Testing at a STANAG 2 threat level.

13 Claims, 4 Drawing Sheets

(56) References Cited

U.S. PATENT DOCUMENTS

| | | |
|---|---|---|
| 3,634,177 A | 1/1972 | Glaser |
| 3,671,370 A * | 6/1972 | Littell, Jr. ......... B32B 17/10045 428/38 |
| 3,701,636 A | 10/1972 | Labelle, Jr. et al. |
| 3,846,082 A | 11/1974 | Labelle et al. |
| 3,915,662 A | 10/1975 | Labelle et al. |
| 3,917,891 A | 11/1975 | Cooke et al. |
| 3,930,452 A | 1/1976 | Van Laethem et al. |
| 3,953,174 A | 4/1976 | LaBelle, Jr. |
| 4,028,476 A | 6/1977 | Kleinschmidt et al. |
| 4,075,055 A | 2/1978 | Ciszek et al. |
| 4,079,161 A | 3/1978 | Kile |
| 4,126,731 A | 11/1978 | Nishizawa et al. |
| 4,158,038 A | 6/1979 | Jewett |
| 4,184,907 A | 1/1980 | Yates |
| 4,248,645 A | 2/1981 | Jewett |
| 4,269,652 A | 5/1981 | Yancey |
| 4,271,129 A | 6/1981 | Berkman et al. |
| 4,303,465 A | 12/1981 | Bagdasarov et al. |
| 4,390,505 A | 6/1983 | Taylor et al. |
| 4,402,786 A | 9/1983 | Little |
| 4,416,723 A | 11/1983 | Pelts et al. |
| 4,443,411 A | 4/1984 | Kalejs |
| 4,704,943 A | 11/1987 | McDougal |
| 4,751,059 A | 6/1988 | McHugh et al. |
| 4,915,773 A | 4/1990 | Kravetsky et al. |
| 4,930,731 A | 6/1990 | Roy et al. |
| 4,997,628 A | 3/1991 | Piotrowski |
| 5,037,622 A | 8/1991 | Harvey et al. |
| 5,041,783 A | 8/1991 | Ohta et al. |
| 5,356,113 A | 10/1994 | Mizuishi et al. |
| 5,398,640 A | 3/1995 | Locher et al. |
| 5,416,043 A | 5/1995 | Burgener et al. |
| 5,451,553 A | 9/1995 | Scott et al. |
| 5,534,073 A | 7/1996 | Kinoshita et al. |
| 5,558,712 A | 9/1996 | Kalejs |
| 5,660,627 A | 8/1997 | Manente et al. |
| 5,758,845 A | 6/1998 | Sunne et al. |
| 6,009,789 A | 1/2000 | Lyons |
| 6,036,775 A | 3/2000 | Imaeda et al. |
| 6,059,877 A | 5/2000 | Bruel |
| 6,143,633 A | 11/2000 | Bathey |
| 6,177,236 B1 | 1/2001 | Apte |
| 6,413,311 B2 | 7/2002 | Melcher et al. |
| 6,475,942 B1 | 11/2002 | Brewer et al. |
| 6,642,989 B2 | 11/2003 | Umehara et al. |
| 6,692,568 B2 | 2/2004 | Cuomo et al. |
| 6,967,617 B1 | 11/2005 | McMillan et al. |
| 7,163,731 B2 | 1/2007 | Yeshurun et al. |
| 7,175,704 B2 | 2/2007 | D'Evelyn et al. |
| 7,282,381 B2 | 10/2007 | Feltin et al. |
| 7,285,509 B2 | 10/2007 | Bayya et al. |
| 7,348,076 B2 | 3/2008 | Locher et al. |
| 7,584,689 B2 | 9/2009 | Jones et al. |
| 7,793,580 B2 | 9/2010 | Jones et al. |
| 8,025,004 B2 | 9/2011 | Jones et al. |
| 8,157,913 B2 | 4/2012 | Locher et al. |
| RE43,469 E | 6/2012 | Locher et al. |
| 8,297,168 B2 | 10/2012 | Jones et al. |
| 8,685,161 B2 | 4/2014 | Locher et al. |
| 9,926,645 B2 | 3/2018 | Locher et al. |
| 9,963,800 B2 | 5/2018 | Locher et al. |
| 2004/0099206 A1 | 5/2004 | Ackermann et al. |
| 2005/0227117 A1 | 10/2005 | Locher et al. |
| 2005/0247260 A1 | 11/2005 | Shin et al. |
| 2007/0066786 A1 | 3/2007 | Hanson, Jr. et al. |
| 2007/0068375 A1 | 3/2007 | Jones et al. |
| 2007/0068376 A1 | 3/2007 | Jones et al. |
| 2008/0075941 A1 | 3/2008 | Tatartchenko et al. |
| 2008/0282968 A1 | 11/2008 | Amosov |
| 2009/0068453 A1 | 3/2009 | Chung |
| 2009/0130415 A1 | 5/2009 | Mack, III et al. |
| 2009/0308239 A1 | 12/2009 | Jones et al. |
| 2010/0282160 A1 | 11/2010 | Locher et al. |
| 2010/0288117 A1 | 11/2010 | Jones et al. |
| 2012/0001027 A1 | 1/2012 | Jones et al. |
| 2012/0154069 A1 | 6/2012 | Locher et al. |
| 2014/0150716 A1 | 6/2014 | Locher et al. |
| 2015/0115507 A1 | 4/2015 | Sastri et al. |
| 2017/0342591 A1 | 11/2017 | Locher et al. |
| 2018/0016704 A1 | 1/2018 | Locher et al. |
| 2018/0087877 A1 * | 3/2018 | Carton ................ F41H 5/0457 |
| 2018/0223446 A1 | 8/2018 | Locher et al. |

FOREIGN PATENT DOCUMENTS

| | | |
|---|---|---|
| DE | 202901 | 10/1983 |
| EP | 0493903 A1 | 7/1992 |
| GB | 2044630 A | 10/1980 |
| JP | S51136581 A | 11/1976 |
| JP | S52143978 A | 11/1977 |
| JP | S55121996 A | 9/1980 |
| JP | S5659693 A | 5/1981 |
| JP | S5795899 A | 6/1982 |
| JP | S57118091 A | 7/1982 |
| JP | S57175795 A | 10/1982 |
| JP | H032503 A | 1/1991 |
| JP | H0581178 B2 | 11/1993 |
| JP | 2001-085746 A | 3/2001 |
| JP | 2001-118837 A | 4/2001 |
| JP | 2003-112998 A | 4/2003 |
| JP | 2003-313092 A | 11/2003 |
| JP | 2003-327495 A | 11/2003 |
| JP | 2008-522874 A | 7/2008 |
| JP | 2010-504274 A | 2/2010 |
| SU | 1758913 A1 | 8/1992 |
| SU | 1816664 A1 | 5/1993 |
| WO | 03068501 A1 | 8/2003 |
| WO | 2005100646 A1 | 10/2005 |
| WO | 2006135832 A1 | 12/2006 |
| WO | 2007058665 A2 | 5/2007 |
| WO | 2008036888 A1 | 3/2008 |
| WO | 2008130457 A2 | 10/2008 |
| WO | 2009067641 A2 | 5/2009 |

OTHER PUBLICATIONS

United States Statutory Invention Registration #H1567, published Aug. 6, 1996.

U.S. Appl. No. 11/423,203, filed Jun. 9, 2006, Inventors: Christopher D. Jones et al. Published as US20070068375A1.

U.S. Appl. No. 11/423,210, filed Jun. 9, 2006, Inventors: Christopher D. Jones et al.ublished as US20070068376A1.

U.S. Appl. No. 12/549,985, filed Aug. 28, 2009, Inventors: Christopher D. Jones et al. Published as US20090308239A1.

U.S. Appl. No. 12/845,611, filed Jul. 28, 2010, Inventors: Christopher D. Jones et al. Published as US20100288117A1.

U.S. Appl. No. 13/231,109, filed Sep. 13, 2011 Inventors: Christopher D. Jones et al. Published as US20120001027A1.

U.S. Appl. No. 60/689,688, filed Jun. 10, 2005 Inventors: Christopher D. Jones et al.

U.S. Appl. No. 60/761,814, filed Jan. 25, 2006 Inventors: Christopher D. Jones et al.

U.S. Appl. No. 11/858,949, filed Sep. 21, 2007 Inventors: Vitali Tatartchenko et al. Published as US20080075941A1.

U.S. Appl. No. 60/826,723, filed Sep. 22, 2006 Inventors: Vitali Tatartchenko et al.

U.S. Appl. No. 60/989,756, filed Nov. 21, 2007, Inventors: Christopher D. Jones et al.

U.S. Appl. No. 12/274,593, filed Nov. 20, 2008, Inventors: Christopher D. Jones et al. Published as US20090130415A1.

U.S. Appl. No. 60/981,983, filed Oct. 23, 2007, Inventors: Vitali Tatarchenko et al.

"Army Materials Research: Transforming Land Combat Through New Technologies," AMPTIAC Quarterly, 2004, vol. 8, No. 4, 11 pages. URL: <http://amptiac.alionscience.com/quarterly>.

"Enhanced Vision System," Kollsman, Inc.; 2 pages. URL: <www.kollsman.com/products/commercial-aviation-systems/enahnced-vision-system.asp>; downloaded Jan. 5, 2007.

(56) References Cited

OTHER PUBLICATIONS

"Oran OSG Armor," Israel at Eurosatory 2004, Exhibition dates Jun. 14-18, 2004, 3 pages.
"Transparent Armor Systems" US Armor Research Laboratory, 2 pages, Date Unknown.
"Sniper XR—The World's Most Advanced Targeting Pod," Lockheed Martin Corp., 2003; 2 pages. URL: <www.missilesandfirecontrol.com>.
"Alon Optical Ceramic—Comparison to Window Materials", Surmet Corp., Company Literature #M301030, (date unknown), 1 page.
Department of Defense; "Department of Defense Test Method Standard—V50 Ballistic Test for Armor" MIL-STD-662F; Dec. 18, 1997; 23 pages.
"Emerging Scanning Results: Transparent Ceramics", PATH.US Army Research Laboratory, URL: <http://www.pathnet.org/sp.asp?id=7539>, content updated Apr. 14, 2003, downloaded Apr. 8, 2008, 2 pages.
"HMMWV Lightweight Replacement Armored Door" Specs from web:www2.eps.gov, 3 pages, date unknown.
Saint-Gobain Crystals & Detectors; Quotation of Sapphire Plate; Apr. 7, 2003; 2 pages.
Declaration of John W Locher, 5 pages, Oct. 14, 2009.
Machine English translation of JP 2003-327495 retrieved form the JPO website on Oct. 2, 2010.
Summary of crystal annealing records, dated Nov. 20, 2006.
Pages from the notebook of John Locher dated Sep. 26, 2003-Nov. 21, 2003, pp. 1-9.
Joint Declaration of Inventors John W. Locher and Steven A. Zanella, 17 pages, dated May 4, 2017.
Labelle, Jr. et al., "Growth of Controlled Profile Crystals from the Melt: Part II—Edge-Defined, Film-Fed Growth (EFG)", Materials Research Bulletin, vol. 6, 1997, pp. 581-590.
Computerized project log created and maintained by inventor Steven Zanella, dated from Jun. 8, 2000-Mar. 11, 2004, pp. 1-15.
Spreadsheet that shows the date Growth 7131-6 was created and correlates Growth 7131-6 with Crystals No. 166574, dated from Nov. 14, 2002-Aug. 15, 2003, pp. 1-4.
Affidavit regarding Internet Archive record, dated Jan. 26, 2016, pp. 1-7.
Creation record of Growth 7131-1 (Crystal No. 166298), dated Nov. 5, 2002, pp. 1-2.
Creation record of Growth 7131-2 (Crystal No. 166330), dated Nov. 6, 2002, pp. 1-2.
Creation record of Growth 7131-3 (Crystal No. 166367), dated Nov. 7, 2002, pp. 1-2.
Creation record of Growth 7131-4 (Crystal No. 166490), dated Nov. 12, 2002, pp. 1-2.
Creation record of Growth 7131-6, dated Nov. 14, 2002, pp. 1-2.
Creation record of Growth 7131-11 (Crystal No. 167146), dated Dec. 17, 2002, pp. 1-2.
Creation record of Growth 7131-17 (Crystal No. 167761), dated Jan. 10, 2003, pp. 1-2.
Creation record of Growth 7131-18 (Crystal No. 167795), dated Jan. 11, 2003, pp. 1-2.
Creation record of Growth 7131-20 (Crystal No. 167890), dated Jan. 15, 2003, pp. 1-2.
"Properties and Benefits of Sapphire: A Quick Reference Guide", Saphikon, Inc., Saint-Gobain Semiconductor. Http://web.archive.org/web/20030315075922/http://www.saphikon.com/qrg.pdf. Mar. 15, 2003.
Request for Supplemental examination for control No. 96/000,210, dated May 4, 2017, pp. 1-43.
Reasons for substantial new questions of patentability determination for U.S. Appl. No. 96/000,210, dated Jun. 22, 2017, pp. 1-10 (11 pages total with cover sheet).
Supplemental Examination Certificate for U.S. Appl. No. 96/000,210, dated Jun. 22, 2017, p. 1 (2 pages total with cover sheet).
Request for Supplemental examination for U.S. Appl. No. 96/000,211, dated May 4, 2017, pp. 1-42.

Ex parte reexamination ordered for U.S. Appl. No. 96/000,211, dated Jul. 18, 2017, 2 pages.
Supplemental Examination Certificate for U.S. Appl. No. 96/000,211, dated Jul. 13, 2017, p. 1 (2 pages total with cover sheet).
Reasons for substantial new questions of patentability determination for U.S. Appl. No. 96/000,211, dated Jul. 13, 2017, pp. 1-10 (11 pages total with cover sheet).
Non-Final Office Action for U.S. Appl. No. 96/000,211, dated Jul. 25, 2017, pp. 1-12 (14 pages total with cover sheet and PTO-892).
Response to Office Action in ex parte reexamination for U.S. Appl. No. 96/000,211, dated Sep. 25, 2017, pp. 1-13.
Joint declaration of inventors John W. Locher and Steven A. Zanella under 37 CFR 1.132, dated Sep. 25, 2017, pp. 1-24 (25 pages total).
Supplemental response to Office Action in ex parte reexamination for U.S. Appl. No. 96/00,211, dated Oct. 17, 2017, pp. 1-8.
Statement of reasons for patentability and/or confirmation for U.S. Appl. No. 96/000,211, dated Nov. 9, 2017, pp. 1-2 (3 pages total with cover sheet).
Non-Final Office Action for U.S. Appl. No. 15/489,415 dated Oct. 30, 2017, 8 pages.
Notice of Allowance for U.S. Appl. No. 15/489,415 dated Jan. 10, 2018, 18 pages.
Non-Final Office Acion for U.S. Appl. No. 15/707,585 dated Dec. 8, 2017, pp. 1-56.
Notice of Allowance for U.S. Appl. No. 15/707,585 dated Mar. 7, 2018, 17 pages.
Declaration of Frank J. Bruni for Inter Partes Review of U.S. Pat. No. Re. 43,469, dated Apr. 25, 2018, 67 pages.
File history of U.S. Pat. No. Re. 43,469, 594 pages.
File history of U.S. Appl. No. 96/000,211, 241 pages.
Kyocera—Industrial Ceramic Products, Single Crystal Sapphire Products, https://web.archive.org/web/20010618161723/http://www.kyocera.com:80/KICC/industrial/products/crystal.htm, downloaded Apr. 2, 2018, 4 pages.
CV—Dr. F.J. Bruni, 4 pages.
Petition for Inter Partes Review of U.S. Pat. No. Re. 43,469, May 4, 2018, 74 pages.
Grujicic et al., "Design and material selection guidelines and strategies for transparent armor systems," Materials and Designs, 2012, pp. 808-819, vol. 34, Elsevier.
"Procedures for Evaluating the Protection Level of Logistic and Light Armoured Vehicles," Allied Engineering Publication 55, 2005, 63 pages.
"Quintium™ Transparent Armor," The Hanson Group, LLC, 2 pages, http://www.hansonco.net/quintium.php, publication date unknown, accessed Sep. 17, 2017.
Chalmers et al., "Edge-Defined, Film-Fed Crystal Growth", Journal of Crystal Growth 13/14, 1972, pp. 84-87.
Chalmers et al., "Growth of Controlled Profile Crystals from the Melt: Part III—Theory", Materials Research Bulletin, vol. 6, 1971, pp. 681-690.
Harris, Daniel C, "Materials for Infrared Windows and Domes—Properties and Performance," SPIE—The International Society for Optical Engineering, SPIE Optical Engineering Press, 1999, Bellingham, US, p. 176.
Patel, Parimal J. et al., "Transparent ceramics for armor and EM window applications," Inorganic Optical Materials II, Proceedings of SPIE vol. 4102, Oct. 25, 2000, 15 pages.
Antonov et al., "A Review of Developments in Shaped Crystal Growth of Sapphire by the Stepanov and Related Techniquies", Progress in Crystal Growth and Characterization of Materials, 2002, pp. 63-122.
Askinazi, Joel et al., "Development of large aperture, monolithic sapphire optical windows", Proceedings of SPIE, vol. 4375, 2001, pp. 1-11.
Ballard, Jr., Clifford P, "A Transparent Ceramic Armor," Sandia Laboratories Report; May 1978; 28 pages.
Labelle, Jr. et al., "Growth of Controlled Profile Crystals from the Melt: Part I—Sapphire Filaments", Materials Research Bulletin, vol. 6, 1997, pp. 571-580.
"Denisov et al., ""Optical Anomalies and Residual Stresses in Basal-Plane-Faceted Ribbons of Stepanov-Grown Sapphire Crystals,"" Defects and Impurity Centers, Dislocations, and Physics of

(56) References Cited

OTHER PUBLICATIONS

Strength, ISSN1063-7834, Physics of the Solid State, 2007, vol. 49, No. 3, Pleiades Publishing, Ltd., pp. 472-477."

Flerov et al., "The way to producing of the perfect sapphire crystals," Materials Research Society Symp., vol. 329, 1994, pp. 51-56.

Gentilman, R. et al., "Large-area sapphire windows," Society of Photo-Optical Instrumentation Engineers, vol. 5078 (2003), SPIE; pp. 54-60.

Gentilman, R. et al., "Low-cost sapphire windows," Society of Photo-Optical Instrumentation Engineers; vol. 5078 (2003); pp. 12-17.

Harris, Daniel C., "A Century of Sapphire Crystal Growth", Proceedings of the 10th DoD Electromagnetic Windows Symposium, Norfolk, Virginia, May 2004, 74 pages. URL: http://www.dtic.mil/cgibin/GetTRDoc?Location=U2&doc=GetTRDoc.pdf&AD=ADA460239.

Harris, Daniel C, "Materials for Infrared Windows and Domes—Properties and Performance," SPIE—The International Society for Optical Engineering, SPIE Optical Engineering Press, 1999, Bellingham, US, 7 pages.

Hoshikawa Keigo et al., "Growth of Single-Crystal Sapphire Ribbon through EFG", Applied Physics, vol. 46, No. 9 (1977), pp. 1-5E.

Jones Christopher D. et al., "Large-Area Sapphire for Transparent Armor," American Ceramic Society Bulletin, vol. 85, No. 3, Mar. 2006, pp. 24-26.

Jones Christopher et al., "Large area EFG Sapphire for Transparent Armor," Abstract for the 30th International Conference and Exposition on Advanced Ceramics and Composites, Control ID: 191574, Jan. 22-27, 2006, 1 page.

Khattak Chandra P. et al., "Correlation of sapphire quality with uniformity and optical properties", Proceedings of SPIE, vol. 3060, 1997, pp. 250-257.

Labelle, Jr., H. E. "EFG, the Invention and Application to Sapphire Growth", Journal of Crystal Growth, vol. 50, North-Holland Published Company, Oct. 30, 1979, pp. 8-17.

Locher et al., "Large Diameter Sapphire Window from Single Crystal Sheets," Proceedings of the 5th DOD Electromagnetic Window Symposium, vol. 1, Oct. 1993, 10 pages.

Locher, J.W., et al. "The Production of 225x325 mm sapphire windows for IR (1-5 µm) Applications", Window and Dome Technologies VIII, Proceedings of SPIE, vol. 5078, 2003, pp. 40-46.

Lundin, "Air Force Testing New Transparent Armor," Air Force Research Laboratory Public Affairs, Air Force Link; Oct. 17, 2005; 2 pages. URL: <http://www.af.mil/news/story asp?id=123012131>.

Lundin, "AFRL Tests Transparent Armor" UDRI News; Oct. 2005; 2 pages. URL: <http://www.udri.udayton.edu/news/news1005.htm>.

Miyazawa, "Optical Crystals Survived in Information Technology Systems," Opto-Electronics Review, vol. 11 (2) 2003, pp. 77-84.

Novak et al., "The Production of EFG Sapphire Ribbon for Heteroepitaxial Silicon Substrates", Journal of Crystal Growth, vol. 50, 1980, pp. 143-150.

Patel, Parimal J. et al., "Transparent Armor," AMPTIAC, The AMPTIAC Newsletter, vol. 4, No. 3, Fall 2000, 24 pages.

Sandstrom David J., "Armor Anti-Armor Materials by Design," Los Alamos Science, Summer 1989, 15 pages.

Schmid, Frederick et al., "Producing large Sapphire for optical applications", American Ceramic Society Bulletin, vol. 73, No. 2, Feb. 2004, pp. 39-44.

Schmid, F. et al., "Growth of very large sapphire crystals for optical applications", Proceedings of SPIE, vol. 3424 (Jul. 1998), pp. 37-46.

Schmid, Frederick et al., "Current Status of very large sapphire crystal growth for optical applications", Proceedings of SPIE, vol. 3705, Apr. 1999, pp. 70-76.

Wada, Kazumi et al., "Growth and Characterization of Sapphire Ribbon Crystals", Journal of Crystal Growth vol. 50, North-Holland Published Company, Feb. 27, 1979, pp. 151-159.

Wang et al., "Dislocation Analysis for Large-Sized Sapphire Single Crystal Grown by Sapmac Method," Chinese Journal of Structural Chemistry, vol. 26, No. 11, 2007, pp. 1332-1336.

Australian Examiners Report dated Mar. 24, 2009 issued in Australian application No. 2006257867, 2 pages.

Australian Examiners Report dated Apr. 1, 2010 issued in Australian application No. 2007299677, 3 pages.

Canadian Office Action dated Sep. 3, 2008 issued in Canadian Patent Application No. 2,560,998, 4 pages.

Chinese Office Action dated Jul. 4, 2008 issued in Chinese Patent Application No. 200580012188.0, 18 pages.

European Office Action dated Mar. 19, 2008 issued in corresponding European Patent Application No. 06 772 823.8, 5 pages.

European Office Action dated Aug. 11, 2008 issued in corresponding European Patent Application No. 06 772 823.8, 3 pages.

European Office Action dated Feb. 23, 2009 issued in corresponding European Patent Application No. 06 772 823.8, 3 pages.

Russian Office Action issued in Russian Patent Application No. 2006135362 (English translation), dated Dec. 14, 2007, 4 pages.

"Ukrainian Office Action issued in Ukrainian Patent Application No. a 2009 02529/M dated Nov. 30, 2010, 4 pages. Report of the Foreign Associate."

Non-Final Office Action for U.S. Appl. No. 10/820,468, dated Jul. 28, 2005, 13 pages.

Final Office Action for U.S. Appl. No. 10/820,468, dated Mar. 9, 2006, 7 pages.

Non-Final Office Action for U.S. Appl. No. 10/820,468, dated Dec. 4, 2006, 7 pages.

Non-Final Office Action for U.S. Appl. No. 12/021,758, dated May 3, 2011, 5 pages.

Non-Final Office Action for U.S. Appl. No. 11/423,203, dated Apr. 2, 2008, 14 pages.

Final Office Action for U.S. Appl. No. 11/423,203, dated Oct. 31, 2008, 9 pages.

Non-Final Office Action for U.S. Appl. No. 11/423,210, dated Oct. 14, 2008, 8 pages.

International Search Report and Written Opinion for International Application No. PCT/US2008/084277, dated May 26, 2009, 12 pages.

International Preliminary Report on Patentability for International Application No. PCT/US2007/079149, dated Mar. 24, 2009, 9 pages.

International Search Report dated Jul. 28, 2005 issued in PCT Application No. PCT/US2005/011404, 7 pages.

Written Opinion issued in PCT Application No. PCT/US2005/011404, 5 pages.

International Search Report dated Nov. 22, 2006 issued in PCT Application No. PCT/US2006/026677, 6 pages.

Written Opinion issued in PCT Application No. PCT/US2006/02667, dated Nov. 22, 2006, 9 pages.

Askinazi, Joel, "Large aperture, broadband sapphire windows for common aperture, target acquisition, tracking and surveillance systems," SPIE Proceedings, vol. 3060, 1997, pp. 214-225.

Harris, Daniel C, "Materials for Infrared Windows and Domes—Properties and Performance," SPIE—The International Society for Optical Engineering, SPIE Optical Engineering Press, 1999, Bellingham, US, 340 pages.

Schmid, Frederick et al., "Current Status of Sapphire for Optics," Proc. SPIE, vol. 10289, Advanced Materials for Optics and Precision Structures: A Critical Review, Jul. 28, 1997, pp. 102890A-1-102890A-22.

Affidavit Butler regarding Internet Archive record, dated May 17, 2018, 6 pages.

Declaration of Frank J. Bruni for Inter Partes Review of U.S. Pat. No. 9,926,645, dated Aug. 16, 2019, 85 pages.

Declaration of Frank J. Bruni for Inter Partes Review of U.S. Pat. No. 9,963,800, dated Aug. 17, 2019, 99 pages.

Declaration of Doug Hibbard for Inter Partes Review of U.S. Pat. No. 9,926,645, dated Sep. 20, 2018, 4 pages.

File history of 9926645, dated Apr. 17, 2017-Mar. 27, 2018, 314 pages.

File history of 9963800, dated Sep. 18, 2017-May 8, 2018, 351 pages.

(56) References Cited

OTHER PUBLICATIONS

File history of 7348076, dated Apr. 8, 2004-Jul. 23, 2012, 221 pages.
File history of U.S. Appl. No. 96/000,210, dated May 4, 2017-Jun. 22, 2017, 155 pages.
Petition for Inter Partes Review of U.S. Pat. No. 9,926,645, dated Aug. 22, 2020, 82 pages.
Petition for Inter Partes Review of U.S. Pat. No. 9,963,800, dated Aug. 22, 2020, 67 pages.

* cited by examiner

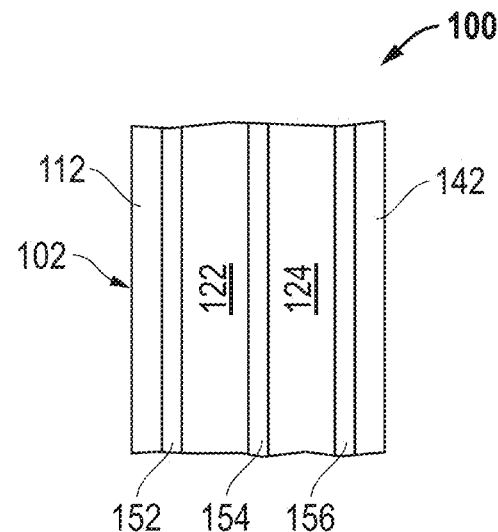
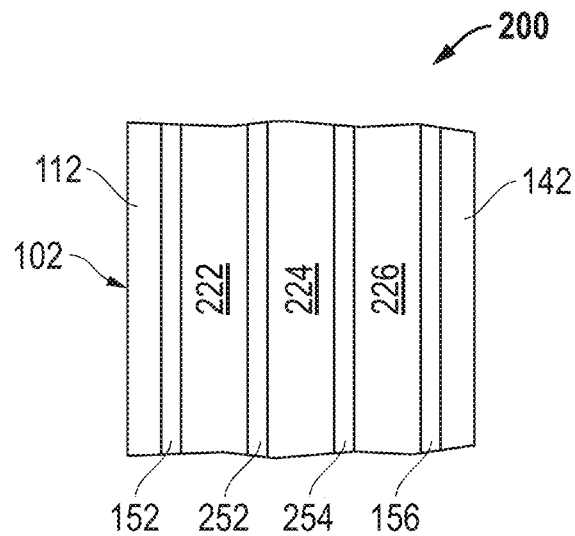
FIG. 1
FIG. 2
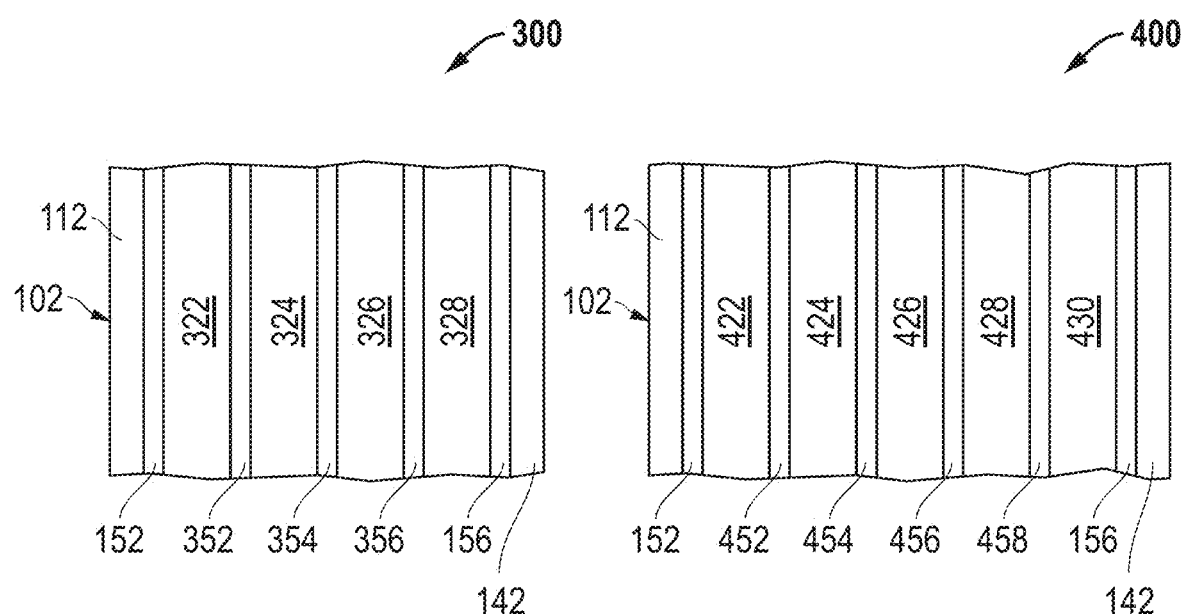
FIG. 3
FIG. 4

FIG. 5

| Sample | Composition | Area (mm x mm) | Thickness (mm) | Areal Density kg/m² | Projectile | Projectile Velocity m/s | Energy J | Effectiveness J*m²/kg | Penetration |
|---|---|---|---|---|---|---|---|---|---|
| 1 | A | 200x200 | 24 | 46 | 7.62x51 M-80 Ball (9.7 g) | 838 | 3406 | 75 | No |
| 2 | B | 200x200 | 27 | 47 | 7.62x39 API-BZ (7.8 g) | 695 | 1877 | 40 | No |
| 3 | C | 300x300 | 39 | 52 | 20 mm FSP (53.8 g) | 630 | 10677 | 128 | No |
| 4 | D | 300x300 | 27 | 57 | .30-06 APM2 (10.8 g) | 868 | 4068 | 71 | No |
| 5 | E | 150x150 | 29 | 63 | 7.62x54R B32 API (10 g) | 768 | 3647 | 68 | No |
| 6 | F | 300x300 | 81 | 157 | 7.62x51 AP (WC core) (8.4 g) | 930 | 3633 | 23 | No |
| 7 | G | 300x300 | 67 | 132 | 14.5x114 API/B32 (63.4 g) | 911 | 26308 | 200 | No |
| 8 | G | 300x300 | 67 | 132 | 20 mm FSP (53.8 g) | 960 | 24794 | 189 | No |

TRANSPARENT COMPOSITE HAVING A LAMINATED STRUCTURE

CROSS-REFERENCE TO RELATED APPLICATION

This application claims priority under 35 U.S.C. § 119(e) to U.S. Provisional Application No. 62/565,763, entitled "TRANSPARENT COMPOSITE HAVING A LAMINATED STRUCTURE," by Drew T. Haven et al., filed Sep. 29, 2017, which is assigned to the current assignee hereof and is incorporated herein by reference in its entirety.

BACKGROUND

Field of the Disclosure

The present disclosure is directed to transparent composite having a laminated structure.

Description of Related Art

A transparent composite can be in the form of a laminate that includes at least one sapphire layer, at least one glass layer, and a polycarbonate backing layer. The transparent components can be used in transparent armor. For any threat level, a lower areal density of the transparent composite that does not allow penetration of a projectile is desired. Sapphire has been used to address higher threat levels, however, at the same thickness, sapphire is significantly denser than glass and polycarbonate. Further improvements in transparent composites are desired.

BRIEF DESCRIPTION OF THE DRAWINGS

Embodiments are illustrated by way of example and are not limited in the accompanying figures.

FIG. 1 includes an illustration of a cross-sectional view of a portion of a transparent composite according to an embodiment described herein.

FIG. 2 includes an illustration of a cross-sectional view of a portion of a transparent composite according to another embodiment described herein.

FIG. 3 includes an illustration of a cross-sectional view of a portion of a transparent composite according to yet another embodiment described herein.

FIG. 4 includes an illustration of a cross-sectional view of a portion of a transparent composite according to a further embodiment described herein.

FIG. 5 includes a table of data for transparent composites described in the Examples section of this specification.

Figure 6:
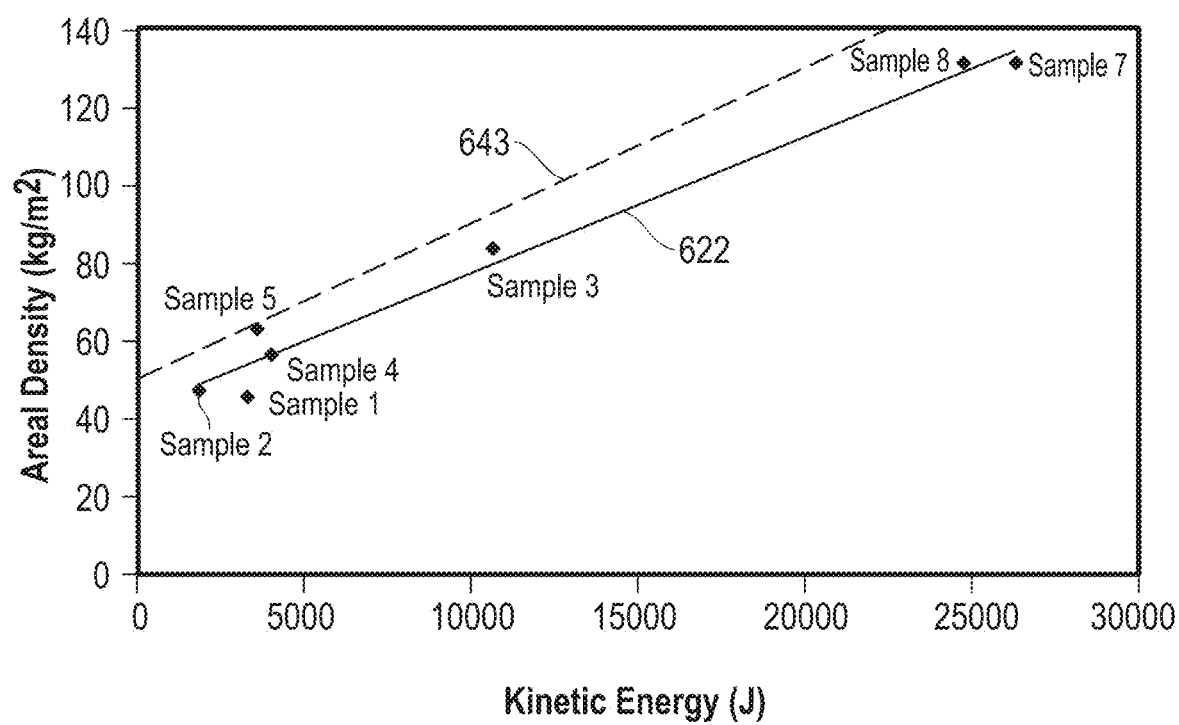
FIG. 6 includes a plot of areal density vs. kinetic energy including data for samples within the Examples section of this specification.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

The term "ceramic" is intended to mean a material that is not amorphous. A ceramic material can be polycrystalline or monocrystalline form. For example, Al2O3 can be monocrystalline (sapphire) or can be in the form of polycrystalline grains. Many glasses include amorphous SiO2, and such glasses are not considered ceramic for the purposes of this specification.

The term "elastomer" is intended to mean a substance that can be stretched or bent and return to its original shape. Polymethyl(methacrylate) and polycarbonate are not elastomers.

As used herein, "NIJ" refers to NIT Standard 0108.01 (September 1985) as formulated by the National Institute of Justice of the US Department of Justice.

The term "NIJ X" is intended to mean NIJ, where X corresponds to the Armor Type in Table 1 of NIJ, unless as further defined or explicitly stated herein to the contrary. For example, NIJ II-A corresponds to Armor Type II-A in Table 1 of NIJ.

As used herein, "STANAG" refers to STANAG 4569, which is a NATO Standardization Agreement covering the standards for protection levels for occupants of logistic and light armored vehicles, including aircraft. Test conditions and projectiles are described in NATO AEP-55 "Procedures for Evaluating the Protection Level of Logistic and Light Armoured Vehicles", Vol. 1 (February 2005), hereinafter "NATO AEP-55".

The term "STANAG X" is intended to mean STANAG 4569 Level X, where X corresponds to the threat level, unless as further defined or explicitly stated herein to the contrary. For example, STANAG 2 corresponds to test conditions and projectiles for Level 2 in Table A1 of NATO AEP-55. All STANAG Levels are for KE Threat unless explicitly stated to the contrary.

The term "Multiple Hit Testing" is intended to mean testing using conditions and procedures in Sections 1 to 3 of Multiple Hit Testing, Appendix B of NATO AEP-55, unless explicitly stated to the contrary.

The term "polyurea" is intended to mean a polymer formed from a reaction of an isocyanate and an amine.

The term "strike face" is intended to mean a surface of a transparent composite that is configured to receive the initial impact of a projectile or other object.

The term "translucent," when referring to a material, is intended to mean that the material allows for the transmission of light but does not provide for a clear image of objects viewed through the material.

The term "transparent," when referring to a material, is intended to mean that the material allows for transmission of light and provides a clear, discernable image of objects viewed through the material. A visible transparent material is transparent in the visible range, and an IR transparent material is transparent in the infrared radiation range and a "UV transparent" material is transparent in the ultraviolet radiation range.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the transparent composite arts.

A novel transparent composite has been developed that can prevent penetration of projectiles or other objects at a variety of threat levels, including STANAG 4, at a relatively lower areal density, as compared to convention transparent armor. The transparent composite can be used in aircraft, spacecraft, underwater vehicles, and civilian or military ground vehicles. The transparent composites as describe herein are useful in providing protection at different threat levels as specified in NIJ and STANAG while providing sufficient transmission of light.

In an aspect, the transparent composite can include a polymer layer. In an embodiment, two inorganic layers closer to the strike face of the transparent composite may be present to help dissipate kinetic energy before reaching the polymer layer. Adhesion layers can be used between the layers. In another aspect, the transparent composite can be well suited for preventing penetration by a projectile having at least 4000 J of kinetic energy. The transparent composite can have an areal density such that:

$$\rho_A \leq (E_p/250)+50, \text{where}$$

$\rho_A$ is the areal density in units of $kg/m^2$; and
$E_p$ is the kinetic energy of the projectile in units of J.

In a further aspect, the transparent composite can provide a lower areal density for projectiles that include a core that has about the same hardness as a transparent ceramic sheet. In an embodiment, the transparent composite is configured to prevent penetration a 7.62×51 mm AP (WC core) projectile at a velocity of 911 m/s and has an areal density of at most 159 $kg/m^2$.

In still a further aspect, the transparent composite can withstand a STANAG 4 threat level with a relatively low areal density. In an embodiment, the transparent composite is configured to prevent penetration of a projectile using STANAG 4 testing conditions, wherein the transparent composite has an areal density of at most 200 $kg/m^2$ or at most 158 $kg/m^2$.

In yet another aspect, a transparent composite can withstand a multiple hits in accordance with Multiple Hit Testing at a STANAG 1, 2, or 3 threat level. In an embodiment, the transparent composite is configured to prevent penetration of any projectiles using Multiple Hit Testing at a STANAG 2 threat level, wherein the transparent composite has an areal density of at most 99 $kg/m^2$, at most 85 $kg/m^2$, or at most 65 $kg/m^2$.

In general, the configuration of the transparent composite can include one or more transparent ceramic layers, one or more glass layers, one or more polymer layers, and a backing layer. The properties and compositions of the layers are described in more detail below.

The transparent ceramic layer can have a composition wherein the material of the transparent ceramic layer is harder than the hardness of the projectile or other object that the transparent composite is to withstand. In an embodiment, the transparent ceramic layer can include sapphire (monocrystalline alumina), an aluminum oxynitride (AlON), or a magnesium aluminate. In a particular embodiment, the magnesium aluminate can be MgAl2O4, also called spinel, in a monocrystalline or polycrystalline form. In another particular embodiment, the magnesium aluminate may be magnesium-rich or aluminum-rich MgAl2O4.

Further advances in projectiles are allowing harder core materials to be used. In another embodiment, a transparent ceramic having a hardness similar to the projectile may be used. For example, sapphire (monocrystalline alumina) has a hardness slightly harder than a WC core projectile. In another embodiment, a transparent ceramic material may include a material harder than sapphire, such as diamond, B4C, cubic or wurtzite BN, a boron-carbon-nitrogen compound (for example, BC2N), or the like. The harder materials may help to help modify the shape, break apart, or fracture a projectile having a WC core, similar to sapphire, AlON, and spinel that are harder than and can help modify the shape, break apart, or fracture a projectile having a hardened steel core.

In an embodiment, the transparent ceramic layer can have a thickness of at least 1.1 mm, at least 2 mm, or at least 4 mm, and in another embodiment, the transparent ceramic layer has a thickness of at most 30 mm, at most 20 mm or at most 9 mm. In a particular embodiment, the transparent ceramic layer can have a thickness in a range of 1.1 mm to 30 mm, 2 mm to 20 mm, or 4 mm to 15 mm.

The glass layer can help to reduce the areal density as compared to the same thickness of a layer of several transparent ceramic materials. For example, the specific gravity of sapphire is approximately 4.0, and many compositions of silica-based glasses are in a range of 2.2 to 2.8. Thus, for the same thickness, a glass layer can have an areal density that is in a range of approximately 55% to approximately 70% of an areal density of sapphire. The glass layer can include a mineral glass, such as a glass where silica is the primary constituent (e.g., makes up at least 50 wt %) of the glass. The glass layer can include soda lime glass, low iron glass (less than 1 wt % iron oxide), borosilicate glass, or the like. The glass layer may or may not be chemically strengthened or heat strengthened.

In an embodiment, the glass layer can have a thickness of at least 0.3 mm, at least 2 mm, or at least 4 mm, and in another embodiment, the glass layer has a thickness of at most 25 mm, at most 20 mm, or at most 15 mm. In a particular embodiment, the glass layer can have a thickness in a range of 0.3 mm to 25 mm, 2 mm to 20 mm, or 4 mm to 15 mm.

The polymer layer can further help to reduce the overall density of transparent composite. For the same thickness, a polymer layer may have an areal density that is in a range of approximately 30% to 70% of an areal density of a glass layer. The polymer layer may also improve multiple-hit performance of the transparent composite by helping to keep the transparent composite sufficiently intact even after the transparent composite has received multiple hits. In an embodiment, the polymer layer can include a polyurea, a polyurethane, another suitable transparent polymer, or the like. In a particular embodiment, the polymer layer can include a co-polymer formed from an isocyanate, a polyol, and an amine. In another embodiment, the polymer layer can include an elastomer. In a particular embodiment, the polymer layer can include Quintium™-brand polymer available from The Hanson Group of Peachtree Corners, Ga., USA. In a particular embodiment, the polymer layer can have any one or more of the materials as described within US 2007/0066786, which is incorporated herein by reference in its entirety.

In an embodiment, the polymer layer can have a thickness of at least 3.5 at least 5 mm, or at least 7 mm, and in another embodiment, the polymer layer has a thickness of at most 30 mm, at most 50 mm, or at most 95 mm. In a particular embodiment, the polymer layer can have a thickness in a range of 3.5 mm to 95 mm, 5 mm to 50 mm, or 7 mm to 30 mm.

The backing layer can help to reduce the likelihood of fragments from the projectiles or other layers from reaching an area behind the backing layer. The backing layer can include polycarbonate, an acrylic polymer (for example, polymethyl(methacrylate)), or the like.

In an embodiment, the backing layer can have a thickness of at least 0.5 mm, at least 1.1 mm, or at least 2 mm, and in another embodiment, the backing layer has a thickness of at most 20 mm, at most 15 mm, or at most 9 mm. In a particular embodiment, the backing layer can have a thickness in a range of 0.5 mm to 20 mm, 1.1 mm to 15 mm, or 2 mm to 9 mm.

The adhesion layer allows the transparent composite to be a laminated composite. The adhesion layer can include a heat-cured adhesive, a radiation-cured adhesive, a time-cured adhesive, a chemical-cured adhesive, a catalyst-cured adhesives, or a combination thereof. In an embodiment, the adhesive layer can include a polyurethane, an epoxy, a silicone, a polyvinyl butyral, a polyvinyl acetate, a metal-based adhesive, or the like.

In an embodiment, the adhesive layer can have a thickness of at least 0.1 mm at least 0.2 mm, or at least 0.4 mm, and in another embodiment, the adhesive layer has a thickness of at most 3.0 mm, at most 2.0 mm, or at most 1.5 mm. In a particular embodiment, the adhesive layer can have a thickness in a range of 0.1 mm to 3.0 mm, 0.2 mm to 2.0 mm, or 0.4 to 1.5 mm.

In a further embodiment, the backing layer and its corresponding adhesive layer can be replaced with FAENAC® film (FAE) available from Saint-Gobain Sully, France. FAE may be directly laminated to glass or other surfaces and a layer about 1 mm in thickness can be used in place of a TPU/PC layer of about 4.5 mm in thickness.

After reading this specification, skilled artisans will understand that exemplary materials for the layers are described above. Other materials for the layers can be found in U.S. Pat. No. 7,584,689, which is incorporated herein by reference in its entirety.

FIGS. 1 to 4 include illustrations of cross-sectional views of portions of transparent composites. FIG. 1 illustrates a transparent composite 100 having a strike face 102. In this embodiment, the layer having the highest hardness lies along the strike face 102 to help modify the shape, break apart, or fracture a projectile when the projectile hits the transparent component. In an embodiment, the transparent composite 100 can include a strike face layer 112 along a strike face 102 of the transparent composite 100. Any of the previously described transparent ceramic materials can be used for the strike face layer 112.

The transparent composite 100 further includes intermediate layers 122 and 124. The intermediate layer 122 can include any of the glass materials previously described. In an embodiment, the strike face layer 112 and the intermediate layer 122 are inorganic layers. In an embodiment, the inorganic layers can help to dissipate kinetic energy of a projectile before reaching the intermediate layer 124. In an embodiment, the intermediate layer 124 can be a polymer layer. When only one of inorganic layer lies between the strike face and the intermediate layer 124, the likelihood that the projectile will melt the polymer of the intermediate layer 124 significantly increases. The polymer layer can include any of the previously described polymer materials. In a particular embodiment, the polymer layer can be an elastomer. The material of the polymer layer can have a lower density as compared to glass, and thus, can help to reduce the areal density of the transparent composite 100 and provide further strength for the transparent composite 100.

The transparent composite 100 can also include the backing layer 142. The backing layer 142 can include any of the previously described materials for the backing layer.

The transparent composite 100 includes adhesive layers 152, 154, and 156 that are disposed between the previously described layers. The adhesive layers 152, 154, and 156 can include any of the previously described materials for the adhesive layer. As compared to one another, the adhesive layers 152, 154, and 156 can have the same composition or different compositions and can have the same thickness or different thicknesses. In another embodiment, not all adhesive layers 152, 154, and 156 may be present. For example, the material for the intermediate layer 124 may be cast, coated, or otherwise deposited onto the intermediate layer 122 or the backing layer 142. In another example, the combination of the adhesive layer 156 and the backing layer 142 may be replaced by FAE.

As the threat level increases, layers of the transparent composite may be thickened or an additional layer can be used, as illustrated in FIG. 2. FIG. 2 includes a transparent composite 200 that includes intermediate layers 222, 224, and 226 and adhesive layers 252 and 254, in addition to some of the layers as previously described with respect to the transparent composite 100. The intermediate layer 222 can be a transparent ceramic layer or a glass layer, the intermediate layer 224 can be a glass layer or a polymer layer, and the intermediate layer 226 can be a polymer layer. When the intermediate layer 222 is a transparent ceramic layer, the intermediate layer 222 and the transparent ceramic layer 112 can have the same composition or different compositions and can have the same thickness or different thicknesses. In an embodiment, the transparent ceramic layer 112 may have a hardness harder than a hardness of the intermediate layer 222, even when the intermediate layer 222 includes a transparent ceramic.

When the intermediate layers 222 and 224 are glass layers, the intermediate layers 222 and 224 can have the same composition or different compositions and can have the same thickness or different thicknesses. When the intermediate layers 224 and 226 are polymer layers, the intermediate layers 224 and 226 can have the same composition or different compositions and can have the same thickness or different thicknesses. In a particular embodiment, the intermediate layers 222 and 224 are glass layers. As compared to one another, the adhesive layers 152, 252, 254, and 156 can have the same composition or different compositions and can have the same thickness or different thicknesses. Similar to the embodiment of FIG. 1, not all of the adhesive layers 152, 252, 254, and 156 are required. The transparent ceramic, glass, polymer, and adhesive layers in the transparent composite 200 can have compositions as previously described.

As the threat level increases, layers of the transparent composite may be thickened or an additional layer can be used, as illustrated in FIG. 3. FIG. 3 includes a transparent composite 300 that can be configured to withstand a threat level corresponding to STANAG 4. The transparent composite 300 includes intermediate layers 322, 324, 326, and 328 and adhesive layers 352, 354, and 356, in addition to some of the layers as previously described with respect to the transparent composite 100. The intermediate layer 322 can be a transparent ceramic layer or a glass layer, the intermediate layer 324 can be a glass layer or a polymer layer, the intermediate layer 326 can be a glass layer or a polymer layer, and the intermediate layer 328 can be a polymer layer. In a particular embodiment, the intermediate layers 322 and 324 are glass layers, and the intermediate layers 326 and 328 are polymer layers.

When the intermediate layer 322 is a transparent ceramic layer, the intermediate layer 322 and the transparent ceramic layer 112 can have the same composition or different compositions and can have the same thickness or different thicknesses. When the intermediate layers 322 and 324 are glass layers, the intermediate layers 322 and 324 can have the same composition or different compositions and can have the same thickness or different thicknesses. In an embodiment, the transparent ceramic layer 112 may have a hardness harder than a hardness of the intermediate layer 322, even when the intermediate layer 322 includes a transparent ceramic. When the intermediate layers 326 and 328 are polymer layers, the intermediate layers 326 and 328 can have the same composition or different compositions and can have the same thickness or different thicknesses. As compared to one another, the adhesive layers 152, 352, 354, 356, and 156 can have the same composition or different compositions and can have the same thickness or different thicknesses. Similar to the embodiment of FIG. 1, not all of the adhesive layers 152, 352, 354, 356, and 156 are required. The transparent ceramic, glass, polymer, and adhesive layers in the transparent composite 300 can have compositions as previously described.

FIG. 4 includes a transparent composite 400 that can be configured to withstand a threat level corresponding to STANAG 4. The transparent composite 400 includes intermediate layers 422, 424, 426, 428, 430 and adhesive layers 452, 454, 456, and 458, in addition to some of the layers as previously described with respect to the transparent composite 100. The intermediate layer 422 can be a transparent ceramic layer or a glass layer, the intermediate layer 424 can be a glass layer or a polymer layer, the intermediate layer 426 can be a glass layer or a polymer layer, the intermediate layer 428 can be a glass layer or a polymer layer, and the intermediate layer 430 can be a polymer layer. In a particular embodiment, the intermediate layers 422, 424, and 426 are glass layers, and the intermediate layers 428 and 430 are polymer layers.

When the intermediate layer 422 is a transparent ceramic layer, the intermediate layer 422 and the transparent ceramic layer 112 can have the same composition or different compositions and can have the same thickness or different thicknesses. When the intermediate layers 422 and 424 are glass layers, the intermediate layers 422 and 424 can have the same composition or different compositions and can have the same thickness or different thicknesses. When the intermediate layers 424 and 426 are glass layers, the intermediate layers 424 and 426 can have the same composition or different compositions and can have the same thickness or different thicknesses. When the intermediate layers 426 and 428 are polymer layers, the intermediate layers 426 and 428 can have the same composition or different compositions and can have the same thickness or different thicknesses. As compared to one another, the adhesive layers 152, 452, 454, 456, and 156 can have the same composition or different compositions and can have the same thickness or different thicknesses. Similar to the embodiment of FIG. 1, not all of the adhesive layers 152, 452, 454, 456, and 156 are required. The transparent ceramic, glass, polymer, and adhesive layers in the transparent composite 400 can have compositions as previously described.

The inventors have discovered transparent composites configured to withstand a threat level corresponding to STANAG 4 and have areal densities of at most 200 kg/m$^2$, at most 158 kg/m$^2$, at most 140 kg/m$^2$, or at most 135 kg/m$^2$. The inventors have also discovered a transparent composite that can withstand a threat level corresponding STANAG 3, WC core and have an areal density of at most 158 kg/m$^2$. The inventors have further discovered transparent composites that can withstand Multiple Hit Testing at a threat level corresponding to STANAG 1, 2, or 3 threat level. In a particular embodiment, a transparent composite can withstand Multiple Hit Testing at a threat level corresponding to STANAG 2 threat level and have an areal density of at most 99 kg/m$^2$, at most 85 kg/m$^2$, at most 65 kg/m$^2$, or at most 50 kg/m$^2$. Furthermore, such transparent composites referenced in this paragraph may be achieved with as few as one transparent ceramic layer.

Overall, the transparent composites as described herein can achieve the same threat level at 5% to 20% lower areal density as compared to transparent composites where all intermediate layers are glass layers. The difference in areal density becomes more evident at higher kinetic energies, such as at least 4000 J, at least 5000 J, or at least 10,000 J. Higher kinetic energy can occur at a threat level corresponding to STANAG 2 when using a 20 mm fragment simulated projectile (FSP) (53.8 g) and STANAG 4, whether using a 14.5 mm×114 API/B32 projectile or a 20 mm FSP (53.8 g). Further reduction in the areal density may be realized as further optimization work is performed. Additionally, the use of a transparent ceramic layer that is harder than WC, such as B4C, cubic or wurtzite BN or a B-N-C material (e.g., BC2N), may allow transparent composites to become significantly lighter and still withstand a threat level corresponding to STANAG 3 WC.

The thickness may be dependent on the particular construction of the composite. The thickness can be at most 95 mm. The transparent composite 400 may have a thickness of at most 85 mm, the transparent composite 300 may have a thickness of at most 80 mm or at most 70 mm, the transparent composite 200 may have a thickness of at most 50 mm or at most 40 mm, and the transparent composite 100 may have a thickness of at most 40 mm or at most 30 mm.

A transparent composite can have a variety of different shapes including circular, elliptical, rectangular (including square), trapezoidal, hexagonal, octagonal or other polygonal. The transparent composite may be substantially planar. The transparent composite can have a surface area of at least 20 cm$^2$, at least 50 cm$^2$, or at least 110 cm$^2$. Although no theoretical limit to the area is known, practical considerations may limit the surface area of the transparent composite. The transparent composite may have a surface area of at most 50,000 cm$^2$.

The transparent composite can be transparent to light, such as ultraviolet light, visible light, infrared light, or any combination thereof. In an embodiment, transparent composite can have a transmission of at least 70%, at least 75%, or at least 80% for light in a range of 200 nm to 2500 nm. In an embodiment, the transparent composite can have a haze value of at most 3%.

Layers of a composite may be joined together using a combination of heat and pressure. Details regarding lamination and some alternative materials for the transparent composite can be found in U.S. Pat. No. 7,584,689, which is incorporated herein in its entirety.

The transparent composite can be tested using different testing techniques. The transparent composite can be useful in transparent armor applications. NIJ and STANAG testing methods can be used to determine how well the transparent composite performs as transparent armor.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A transparent composite comprising:
a first inorganic layer;
a second inorganic layer; and
a first polymer layer having a thickness of at least 3.5 mm, wherein:
a strike face of the transparent composite is closest to the first layer as compared to each of the second and third layers; and
the second inorganic layer is disposed between the first inorganic layer and the first polymer layers.

Embodiment 2

The transparent composite of Embodiment 1, wherein the transparent composite is configured to prevent penetration of a projectile having a kinetic energy of at least 4000 J, wherein the transparent composite has an areal density such that:

$\rho_A \leq (E_p/250)+50$, where $\rho_A$ is the areal density in units of kg/m$^2$; and
$E_p$ is the kinetic energy of the projectile in units of J.

Embodiment 3

A transparent composite configured to prevent penetration of a projectile having a kinetic energy of at least 4000 J, wherein the transparent composite has an areal density such that:

$\rho_A \leq (E_p/250)+50$, where $\rho_A$ is the areal density in units of kg/m$^2$; and
$E_p$ is the kinetic energy of the projectile in units of J.

Embodiment 4

The transparent composite of Embodiment 2 or 3, wherein the projectile having a kinetic energy of at least 6000 J, at least 8000 J, or at least 10,000 J.

Embodiment 5

A transparent composite configured to prevent penetration a 7.62×51 mm AP (WC core) projectile at a velocity of 911 m/s and has an areal density of at most 159 kg/m$^2$.

Embodiment 6

A transparent composite configured to prevent penetration a projectile using STANAG 4 KE Threat test conditions, wherein the transparent composite has an areal density of at most 200 kg/m$^2$.

Embodiment 7

A transparent composite configured to prevent penetration of at any projectiles using Multiple Hit Testing at a STANAG 2 KE Threat Level, wherein the transparent composite has an areal density of at most 99 kg/m$^2$, at most 85 kg/m$^2$, or at most 65 kg/m$^2$.

Embodiment 8

The transparent composite of any one of Embodiments 3 to 7, further comprising a first polymer layer having a thickness of at least 3.5 mm.

Embodiment 9

The transparent composite of Embodiment 8, further comprising
a first inorganic layer; and
a second inorganic layer,
wherein:
a strike face of the transparent composite is closest to the first layer as compared to each of the second and third layers; and
the second layer is disposed between the first and third layers.

Embodiment 10

The transparent composite of any one of Embodiments 1, 2, and 9, wherein the first inorganic layer is a transparent ceramic layer, and the second inorganic layer is a glass layer.

Embodiment 11

The transparent composite of any one of Embodiments 1, 2, 9, and 10, wherein the first inorganic layer comprises sapphire, an aluminum oxynitride, or a magnesium aluminate.

Embodiment 12

The transparent composite of any one of Embodiments 1, 2, 9, and 10, wherein the first inorganic layer comprises a transparent material harder than sapphire.

Embodiment 13

The transparent composite of any one of Embodiments 1, 2, and 9 to 12, further comprising a backing layer, wherein the first polymer layer is disposed between the first inorganic layer and the backing layer.

Embodiment 14

The transparent composite of any one of Embodiments 1, 2, and 8 to 13, wherein the first polymer layer comprises a polyurethane.

Embodiment 15

The transparent composite of any one of Embodiments 1, 2, and 8 to 13, wherein the first polymer layer comprises an elastomer.

Embodiment 16

The transparent composite of any one of Embodiments 1, 2, 8 to 13, and 15, wherein the first polymer layer comprises a polyurea.

Embodiment 17

The transparent composite of any one of Embodiments 1, 2, 8 to 13, and 15, wherein the first polymer layer comprises a co-polymer formed from an isocyanate, a polyol, and an amine.

Embodiment 18

The transparent composite of any one of Embodiments 1, 2, and 9 to 17, further comprising a second polymer layer disposed between the first polymer layer and the backing layer.

Embodiment 19

The transparent composite of Embodiment 18, wherein the second polymer layer comprises a polyurethane.

Embodiment 20

The transparent composite of Embodiment 18, wherein the second polymer layer comprises an elastomer.

Embodiment 21

The transparent composite of Embodiment 18 or 20, wherein the second polymer layer comprises a polyurea.

Embodiment 22

The transparent composite of Embodiment 18 or 20, wherein the second polymer layer comprises a co-polymer formed from an isocyanate, a polyol, and an amine.

Embodiment 23

The transparent composite of any one of Embodiments 1, 2, and 9 to 22, further comprising a third inorganic layer disposed between the first and second inorganic layers.

Embodiment 24

The transparent composite of Embodiment 23, wherein the third inorganic layer is a transparent ceramic layer or a glass layer.

Embodiment 25

The transparent composite of Embodiment 23, wherein the third inorganic layer comprises sapphire, an aluminum oxynitride, or a magnesium aluminate.

Embodiment 26

The transparent composite of any one of Embodiments 23 to 25, wherein the first inorganic layer has a hardness harder than a hardness of the third inorganic layer.

Embodiment 27

The transparent composite of any one of Embodiments 23 to 26, further comprising a fourth inorganic layer disposed between the second inorganic layer and the first polymer layer.

Embodiment 28

The transparent composite of Embodiment 27, wherein the fourth layer is a glass layer.

Embodiment 29

The transparent composite of any of the preceding Embodiments, wherein the transparent composite has an areal density of at most 158 $kg/m^2$.

Embodiment 30

The transparent composite of any one of Embodiments 1 to 4, and 6 to 25, wherein the transparent composite has an areal density of at most 145 $kg/m^2$ or at most 135 $kg/m^2$.

Embodiment 31

The transparent composite of any one of Embodiments 1 to 4, and 8 to 30, wherein the transparent composite has an areal density of at most 99 $kg/m^2$ or 85 $kg/m^2$.

Embodiment 32

The transparent composite of any one of Embodiments 1 to 4, and 8 to 31, wherein the transparent composite has an areal density of at most 65 $kg/m^2$ or 50 kg $m^2$.

Embodiment 33

The transparent composite of any one of the preceding Embodiments, wherein the transparent composite has an average thickness of at most 80 mm or at most 70 mm.

Embodiment 34

The transparent composite of any one of the preceding Embodiments, wherein the transparent composite has an average thickness of at most 40 mm or at most 30 mm.

EXAMPLES

The examples provided below demonstrate that transparent composites can have relatively low areal densities and still achieve acceptable performance when testing using the STANAG and NIJ standards. The transparent composites may be optimized to reduce further the areal densities and achieve acceptable ballistic performance. Accordingly, the invention is not limited to the examples provided below. The results of single shot tests are summarized in Table 1, which is found in FIG. 5. "Effectiveness" in Table 1 is the kinetic energy of the projectile divided by the areal density for each particular sample. A multi-hit sample is presented after the shingle shot samples. FIG. 6 includes a plot of areal density vs. kinetic energy for Samples 1 to 5, 7, and 8.

Sample 1—STANAG 1

Sample 1 is a transparent composite having Composition A. Composition A included, in physical order, a 5.9 mm sapphire sheet, a 1.3 mm TPU sheet, a 1.6 mm glass sheet, a 1.3 mm TPU sheet, a 9.5 mm Quintium™-brand polymer sheet, a 1.3 mm TPU sheet, and a 3.0 mm sheet of polycarbonate. Sample 1 has a density of 46 kg/m² and a thickness of 24 mm. Sample 1 was tested with a 7.62×51 M-80 Ball (9.7 g) projectile using the testing conditions in STANAG 1. The projectile did not penetrate through all of the layers of the sample. Under the testing conditions, Sample 1 has an effectiveness (kinetic energy/areal density) of 75 J*m²/kg.

Sample 2—STANAG 2

Sample 2 is a transparent composite having Composition B. Composition B included, in physical order, a 6.4 mm sapphire sheet, a 1.3 mm TPU sheet, and, a 19.1 mm Quintium™-brand polymer sheet. Sample 2 has a density of 47 kg/m² and a thickness of 27 mm. Sample 2 was tested with a 7.62×39 API-BZ (7.8 g) projectile using the testing conditions in STANAG 2. The projectile did not penetrate through all of the layers of the sample. Under the testing conditions, Sample 2 has an effectiveness of 40 J*m²/kg.

Sample 3—STANAG 2, Artillery Threat

Sample 3 is a transparent composite having Composition C. Composition C included, in physical order, a 7.6 mm sapphire sheet, a 0.6 mm TPU sheet, a 12.7 mm glass sheet, a 1.3 mm TPU sheet, a 12.7 mm Quintium™-brand polymer sheet, a 1.3 mm TPU sheet, and a 3.0 mm sheet of polycarbonate. Sample 3 has a density of 29 kg/m² and a thickness of 39 mm. Sample 3 was tested with a 20 mm FSP (53.8 g) projectile using the testing conditions in STANAG 2, Artillery Threat. The projectile did not penetrate through all of the layers of the sample. The projectile did not penetrate through all of the layers of the sample. Under the testing conditions, Sample 3 has an effectiveness of 128 J*m²/kg.

Sample 4—NIJ IV

Sample 4 is a transparent composite having Composition D. Composition D included, in physical order, a 7.7 mm sapphire sheet, a 0.6 mm TPU sheet, a 3.2 mm glass sheet, a 1.3 mm TPU sheet, a 9.5 mm Quintium™-brand polymer sheet, a 1.3 mm TPU sheet, and a 3 mm sheet of polycarbonate. Sample 4 has a density of 57 kg/m² and a thickness of 27 mm. Sample 4 was tested with a 0.30-06 APM2 (10.8 g) projectile using the testing conditions in NIJ IV and 0.30-06 test ammunition. The projectile did not penetrate through all of the layers of the sample. Under the testing conditions, Sample 4 has an effectiveness of 71 J*m²/kg.

Sample 5—STANAG 3

Sample 5 is a transparent composite having Composition E. Composition E included, in physical order, a 6.4 mm sapphire sheet, a 0.8 mm TPU sheet, a 12.0 mm glass sheet, a 0.8 mm TPU sheet, a 4.0 mm glass sheet, a 2.5 mm TPU sheet, and a 3 mm sheet of polycarbonate. Sample 5 has a density of 63 kg/m² and a thickness of 29 mm. Sample 5 was tested with a 7.62×54R B32 API (10 g) projectile using the testing conditions in STANAG 3. The projectile did not penetrate through all of the layers of the sample. Under the testing conditions, Sample 5 has an effectiveness of 68 J*m²/kg.

Sample 6—STANAG 3, WC Core

Sample 6 is a transparent composite having Composition F. Composition F included, in physical order, a 7.6 mm sapphire sheet, a 0.6 mm TPU sheet, a 12.7 mm glass sheet, a 1.3 mm TPU sheet, a 12.7 mm glass sheet, a 1.3 mm TPU sheet, a 12.7 mm glass sheet, a 1.3 mm TPU sheet, a 12.7 mm Quintium™-brand polymer sheet, a 1 mm TPU sheet, a 12.7 mm Quintium™-brand polymer sheet, a 1.3 mm TPU sheet, and a 3 mm sheet of polycarbonate. Sample 6 has a density of 63 kg/m² and a thickness of 30 mm. Sample 6 was tested with a 7.62×51 AP (WC core) (8.4 g) projectile using the testing conditions in STANAG 3, WC core. The projectile did not penetrate through all of the layers of the sample. Under the testing conditions, Sample 6 has an effectiveness of 23 J*m²/kg.

Sample 7—STANAG 4

Sample 7 is a transparent composite having Composition G. Composition G included, in physical order, a 7.6 mm sapphire sheet, a 0.6 mm TPU sheet, a 12.7 mm glass sheet, a 1.3 mm TPU sheet, a 12.7 mm glass sheet, a 1.3 mm TPU sheet, a 12.7 mm Quintium™-brand polymer sheet, a 1 mm TPU sheet, a 12.7 mm Quintium™-brand polymer sheet, a 1.3 mm TPU sheet, and a 3 mm sheet of polycarbonate. Sample 7 has a density of 132 kg/m² and a thickness of 67 mm. Sample 7 was tested with a 14.5×114 API/B32 (63.4 g) projectile using the testing conditions in STANAG 4. The projectile did not penetrate through all of the layers of the sample. Under the testing conditions, Sample 7 has an effectiveness of 200 J*m²/kg.

Sample 8—STANAG 4, Artillery Threat

Sample 8 is a transparent composite having Composition G as previously described in Sample 7, and thus, has the same areal density and thickness as Sample 7. Sample 8 was tested with a 20 mm FSP (53.8 g) projectile using the testing conditions in STANAG 4, Artillery Threat. The projectile did not penetrate through all of the layers of the sample. Under the testing conditions, Sample 8 has an effectiveness of 189 J*m²/kg.

FIG. 6 includes a plot of areal density vs. thickness for Samples 1 to 5, 7, and 8. Sample 6 has a projectile that includes a WC core, and thus, does not compare well with other samples that may have a hardened steel core. As can be seen, the samples in FIG. 6 generally lie along a straight line 622. Straight line 622 corresponds to the equation below:

$$\rho_A = (E_p/286) + 43, \text{ where}$$

$\rho_A$ is the areal density in units of kg/m²; and
$E_p$ is the kinetic energy of the projectile in units of J.

The improvement with the novel transparent composites is more significant as energy increases. Thus, transparent composites can be made that can withstand a projectile having a kinetic energy of at least 4000 J, wherein the transparent composites have an areal density such that:

$$\rho_A \leq (E_p/250) + 50, \text{ where}$$

$\rho_A$ is the areal density in units of kg/m²; and
$E_p$ is the kinetic energy of the projectile in units of J.

The equation above is illustrated as dashed line 643 in FIG. 6.

Sample 9—STANAG 2 Multi-Hit

Figure 7:
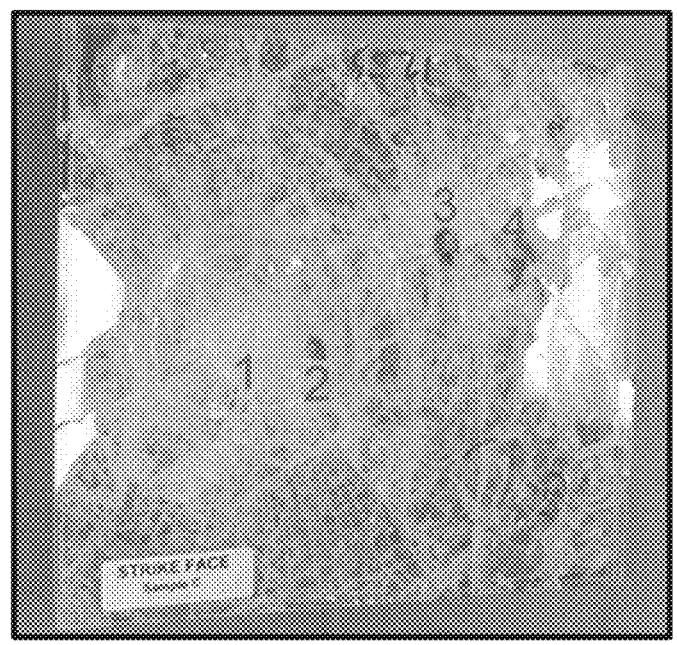
FIGS. 7 and 8 photographs of a strike face and a back surface, respectively, of a transparent armor after testing using multiple hits.
Figure 8:
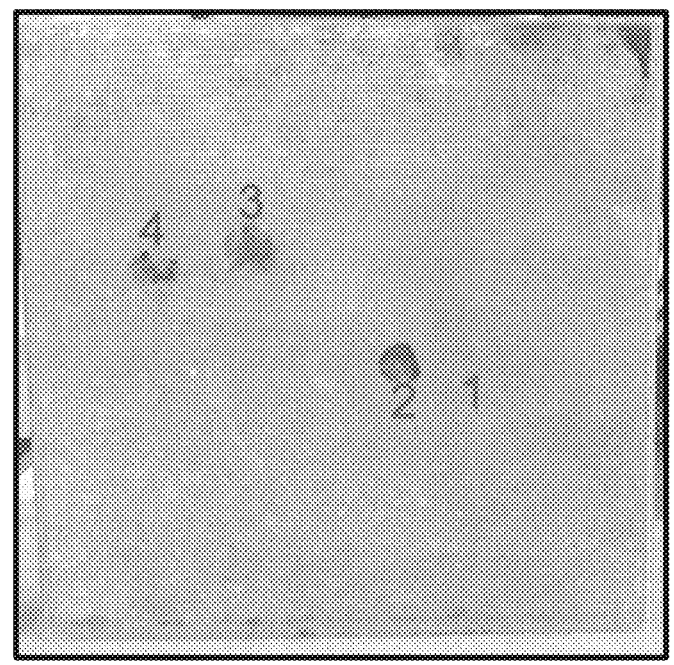

Sample 9 is a transparent composite having composition that included, in physical order, a 6.4 mm sapphire sheet, a 0.6 mm TPU sheet, a 6.4 mm glass sheet, a 1.3 mm TPU sheet, a 12.7 mm Quintium™-brand polymer sheet, a 1.3 mm TPU sheet, and a 3 mm sheet of polycarbonate. Sample 9 has a density of 62 kg/m² and a thickness of 32 mm. Sample 9 was tested with four spaced-apart 7.62×39 API-BZ (7.8 g) projectiles using Multiple Hit Testing at a STANAG 2 threat level. FIGS. 7 and 8 include photographs of the strike face and opposite surface after the multi-hit test was completed. No projectile completely penetrated through Sample 9. Thus, transparent composites as described herein can sufficiently withstand multiple hits.

Transparent composites as described herein can withstand being hit by projectiles or other objects and have lower areal densities as compared to conventional transparent composites. The transparent composites as described herein perform particularly well for projectiles with relatively high kinetic energies. Particular transparent composites have effectivenesses of at least 65 J*m²/kg, 90 J*m²/kg, 120 J*m²/kg, or even higher. Further particular transparent composites can withstand STANAG 4, both the KE Threat and Artillery Threat.

The transparent composites can also withstand multiple hits without complete penetration. The transparent composites can be configured to include at least two inorganic layers before a polymer layer. Such a configuration can reduce the likelihood of melting a polymer layer.

Transparent composites may use a transparent ceramic significantly harder than a core of the projectile. For example, a transparent composite may include a material having a hardness significantly harder than the hardness of WC. Such harder materials may increase the likelihood that a WC core of a projectile may be modified, broken apart, or fractured when it hits such harder material, as compared to sapphire.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Certain features, that are for clarity, described herein in the context of separate embodiments, may also be provided in combination in a single embodiment. Conversely, various features that are, for brevity, described in the context of a single embodiment, may also be provided separately or in a subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A transparent composite comprising:
    a first inorganic layer;
    a second inorganic layer; and
    a first polymer layer having a thickness of at least 5 mm, wherein the first polymer layer comprises a polyurea,
    wherein the first inorganic layer is a transparent ceramic layer,
    wherein a strike face of the transparent composite is closest to the first inorganic layer as compared to each of the second inorganic layer and the first polymer layer;
    wherein the second inorganic layer is disposed between the first inorganic layer and the first polymer layers.

2. The transparent composite of claim 1, wherein the first polymer layer comprises an elastomer.

3. The transparent composite of claim 1, further comprising:
    a third inorganic layer disposed between the first inorganic layer and the second inorganic layer, wherein the third inorganic layer is a transparent ceramic layer or a glass layer;
    a fourth inorganic layer disposed between the second inorganic layer and the first polymer layer, wherein the fourth inorganic layer is a glass layer; and
    a second polymer layer disposed between the first polymer layer and a backing layer.

4. The transparent composite of claim 3, wherein the second polymer layer comprises a polyurethane.

5. The transparent composite of claim 1, wherein transparent composite has an areal density of at most 145 kg/m².

6. The transparent composite of claim 1, wherein the transparent composite has an areal density of at most 135 kg/m².

7. The transparent composite of claim 1, wherein the transparent composite has an areal density of at most 65 kg/m².

8. The transparent composite of claim 1, wherein the transparent composite has an areal density of at most 50 kg/m².

9. The transparent composite of claim 1, wherein the transparent composite has an average thickness of at most 80 mm.

10. The transparent composite of claim 1, wherein the transparent composite has an average thickness of at most 70 mm.

11. The transparent composite of claim 1, wherein the first inorganic layer comprises sapphire, an aluminum oxynitride, or a magnesium aluminate.

12. The transparent composite of claim 1, wherein the first polymer layer comprises a co-polymer formed from an isocyanate, a polyol, and an amine.

13. The transparent composite of claim 1, further comprising a second polymer layer disposed between the first polymer layer and a backing layer.

\* \* \* \* \*